United States Patent [19]

Jindai et al.

[11] Patent Number: 5,800,101
[45] Date of Patent: Sep. 1, 1998

[54] DRILL

[75] Inventors: Masaaki Jindai; Jun Okamoto, both of Itami, Japan

[73] Assignee: Sumitomo Electric Industries, Ltd., Osaka, Japan

[21] Appl. No.: 798,920

[22] Filed: Feb. 12, 1997

[30] Foreign Application Priority Data

Feb. 14, 1996 [JP] Japan .................................. 8-026306
Dec. 26, 1996 [JP] Japan .................................. 8-346828

[51] Int. Cl.⁶ ...................................................... B23B 51/02
[52] U.S. Cl. ............................................... 408/230; 408/227
[58] Field of Search ....................................... 408/199, 223, 408/224, 227, 230, 713

[56] References Cited

U.S. PATENT DOCUMENTS

| | | | |
|---|---|---|---|
| 750,537 | 1/1904 | Hanson | 408/230 |
| 5,312,209 | 5/1994 | Lindblom | 408/230 |
| 5,350,261 | 9/1994 | Takaya et al. | 408/230 |
| 5,704,740 | 1/1998 | Ebenhoch et al. | 408/230 |

FOREIGN PATENT DOCUMENTS

| | | |
|---|---|---|
| 0126409 B | 11/1984 | European Pat. Off. . |
| 0642863 A | 3/1995 | European Pat. Off. . |
| 1302191 A | 12/1962 | France . |
| 3545586 A | 7/1987 | Germany . |
| 7-164227 | 6/1995 | Japan . |
| 665979 A | 6/1988 | Switzerland . |

OTHER PUBLICATIONS

Patent Abstracts of Japanese Patent No. 03142116, Jun. 17, 1991.
Patent Abstracts of Japanese Patent No. 62213911, Oct. 19, 1987.

*Primary Examiner*—Daniel W. Howell
*Attorney, Agent, or Firm*—Wenderoth, Lind & Ponack, L.L.P.

[57] ABSTRACT

A drill capable of drilling a deep hole while keeping high chip discharging ability and having a helical flute whose width and helix angle will not change even after the cutting edges have been regenerated by regrinding. The drill has a tip portion formed with a helical flute having a constant width and helix angle, a rear portion formed with a helical flute which are greater in width and smaller in helix angle than the helical flute formed in the tip portion, and a middle portion provided between the tip portion and rear portion and formed with a helical flute smoothly connecting with the helical flutes of the tip portion and rear portion and having a gradually increasing width and a gradually decreasing helix angle from the tip portion toward the rear portion.

4 Claims, 4 Drawing Sheets

DRILL

BACKGROUND OF THE INVENTION

This invention relates to a drill which shows high drilling performance in forming a deep hole and which maintains stable performance even after its edge has been regenerated by regrinding.

As shown in FIG. 7, a conventional drill typically has a helical chip discharge flute 6 having a constant sectional area and extending at a helix angle of α. Since the flute is helical, chip has to move a long distance along such a flute 6 until they are discharged from the drilled hole. Therefore, the flute is frequently clogged with chip.

To discharge chip smoothly even in drilling a deep hole, Examined Japanese Patent Publication 6-88168 discloses a drill having a chip discharge flute 6 that extends straight, i.e. at a zero helix angle at its portion 6' near the drill tip (see FIG. 6). Unexamined Japanese Patent Publication 7-164227 proposes to gradually increase the sectional area of the flute and gradually reduce its helix angle from the drill tip to discharge chip more smoothly.

One problem with the drill disclosed in Examined Japanese Patent Publication 6-88168 is that it is difficult to effectively use screw effects to obtain a chip pushing force while chip is flowing along the straight portion 6'. Rather, chip in the straight portion is merely pushed up by chip nearer to the drill tip in the axial direction of the drill, so that they will not be discharged with a strong force. Thus, because a hole is drilled deeper, it will become increasingly difficult to smoothly discharge chip.

The drill disclosed in Unexamined Japanese Patent Publication 7-16422 has a problem in that if the drill tip is reground, the width and helix angle of the flute will change, so that the shape of chip produced also will change, making it difficult to discharge chip in a stable manner.

An object of this invention is to improve the ability of the drill to discharge chip in drilling a deep hole, and to maintain its high performance after regrinding.

SUMMARY OF THE INVENTION

According to this invention, there is provided a drill comprising a tip portion formed with a helical flute having a constant width and helix angle, a rear portion formed with a helical flute which has a constant width and helix angle but is greater in width and smaller in helix angle than the helical flute formed in the tip portion, and a middle portion provided between the tip portion and the rear portion and formed with a helical flute smoothly connecting with the helical flutes of the tip portion and the rear portion and having a gradually increasing width and a gradually decreasing helix angle from the tip portion toward the rear portion.

At its end connecting with the helical flute in the drill tip portion, the helical flute in the drill middle portion has the same width and helix angle as the helical flute in the drill tip portion. From this end, its width and helix angle gradually change to its rear end so that they are equal, at the rear end, to those of the helical flute in the drill rear portion. Thus, the helical flute in the drill middle portion smoothly connects with the helical flutes in the drill tip portion and rear portion. Chip can thus be discharged smoothly.

The drill should preferably have a groove width ratio a1:c1 in the drill tip portion of 0.5–1:1, and a groove width ratio a3:c3 in the drill rear portion of 0.8–1.3:1. Also, the helical flute formed in the drill tip portion preferably has a helix angle of 15° –30° and the helical flute formed in the drill rear portion preferably has a helix angle of 3° –8°.

Further, the drill tip portion preferably has a length of 1D–2D (D is the diameter of the drill) and the drill middle portion preferably has a length of 1D–3D.

The flute width ratios are the ratio of the central angles a1, a2 and a3 of the helical flutes 6 shown in FIGS. 2–4 to the central angles c1, c2 and c3 of the lands 5. If the heels 7 shown in FIGS. 2–4 are chamfered, the chamfered portions are excluded in calculating the flute width ratios.

A drill having a helical flute formed therein, the helical flute having a constant width and helix angle at the tip portion of the drill, and the helical flute at the remaining portion of the drill having a gradually increasing width and a gradually decreasing helix angle toward the terminal end of the helical flute.

Since the helical flute has a helix angle gradually decreasing toward the rear end of the drill, chip flow distance chip is short compared with a conventional drill having a constant helix angle. The helical flute in the drill rear portion has also a helix angle, so that chip produced near the drill tip can be pushed out smoothly by screw effects. This also contributes to suppressing increase in the machining power.

In the drill tip portion, the helical flute has a constant width and helix angle, so that the shape of the tip of the drill will never change even after the drill has been repeatedly reground, so that its performance will not change, either.

Other features and objects of the present invention will become apparent from the following description made with reference to the accompanying drawings, in which:

DETAILED DESCRIPTION OF THE PREFERRED EMBODIMENT

Figure 1:
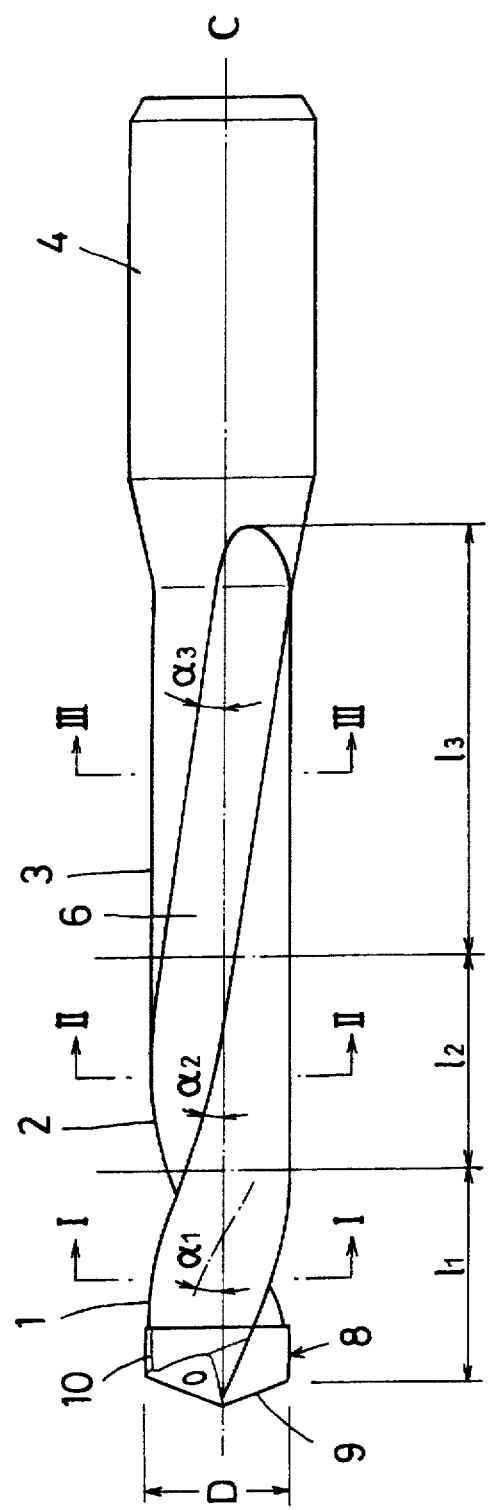
FIG. 1 is a side view of an embodiment of the drill of this invention.
Figure 2:
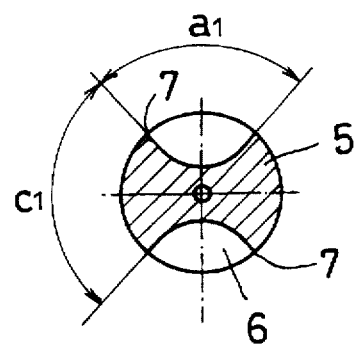
FIG. 2 is a sectional view taken along line I—I of FIG. 1.
Figure 3:
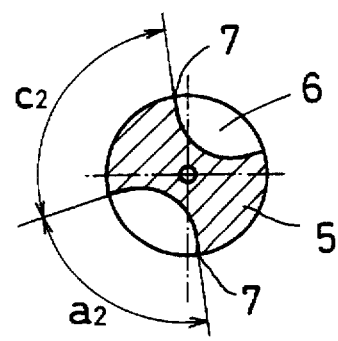
FIG. 3 is a sectional view taken along line II—II of FIG. 1.
Figure 4:
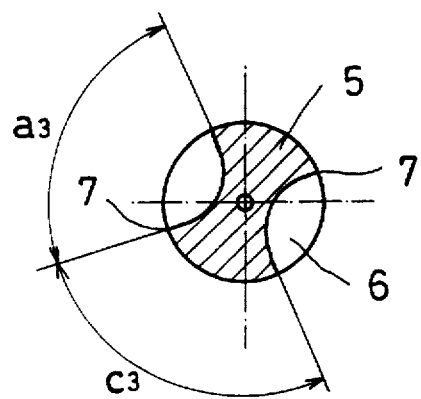
FIG. 4 is a sectional view taken along line III—III of FIG. 1.

FIG. 1 shows a drill embodying this invention. FIGS. 2–4 show sections taken along lines I—I, II—II and III—III of FIG. 1, respectively.

The illustrated drill has a shank 4 integrally formed at its rear end. In the figure, the letter C indicates the central axis of the drill.

The drill has a helical flute 6 having a constant width and a helix angle $\alpha 1$ in a tip portion 1 of the drill near its tip. In a middle portion 2 of the drill, the flute 6 has a width that gradually increases toward the rear end of the drill and a helix angle $\alpha 2$ that gradually decreases toward the drill rear end. In a rear portion 3 of the drill, the flute 6 has a large, constant width and has a helix angle $\alpha 3$ that is smaller than $\alpha 1$.

The drill according to the present invention satisfies the following conditions:

$$\alpha 1 > \alpha 3,\ a1/c1 < a3/c3,\ \alpha 3 \leq \alpha 2 \leq \alpha 1,\ a1/c1 \leq a2/c2 \leq a3/c3$$

This drill is suited for use in drilling deep holes.

Of the helix angles at the respective portions, $\alpha 1$ is constant within the range of 15°–30°, $\alpha 3$ is constant within the range of 3°–8° and $\alpha 2$ is equal to $\alpha 1$ at the end near the drill tip and changes gradually until it becomes equal to $\alpha 3$ at the rear end.

The ratios of the width of the flute to the width of the remaining portion in the drill tip portion 1 and that in the drill rear portion 2, i.e. a1:c1 and a3:c3, should be constant within the range of 0.5–1:1 and 0.8–1.3:1, respectively.

The length $l_1$ of the drill tip portion 1 should not be too long to keep sufficiently high chip discharging properties and should not be too short to prevent undue reduction in the number of times the cutting edges can be reground. The length $l_1$ should be preferably equal to or greater than the drill diameter D and equal to or smaller than twice the drill diameter D. The length $l_2$ of the drill middle portion 2 should be long enough to prevent sharp change in the width of the helical flute which is undue to keep high chip discharging properties. The length $l_2$ should preferably be between 1D and 3D. The length $l_3$ of the drill rear portion 3 is determined to a suitable value, taking into consideration the depth of the hole to be drilled.

Figure 5:
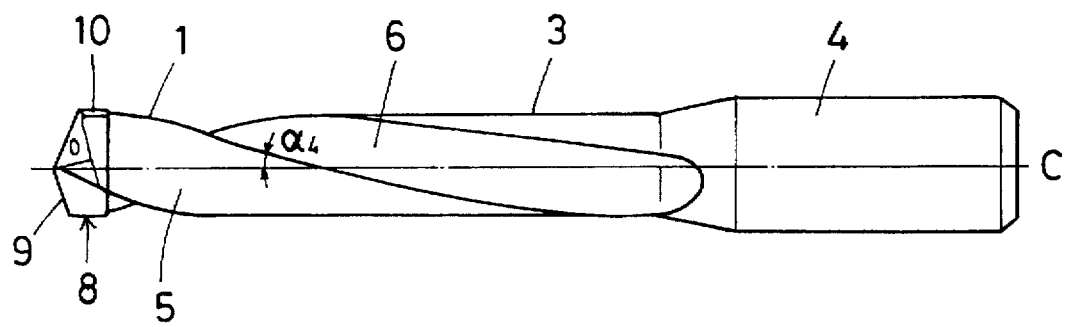
FIG. 5 is a side view of a drill of a second embodiment.

FIG. 5 shows a drill of the second embodiment, which has no middle portion 2. In the drill rear portion 3, the helical flute 6 has a gradually increasing width and a gradually decreasing helix angle $\alpha 4$ from the point at which the portion 3 connects with the portion 1 to the rear end of the flute 6.

In this embodiment, the flute width ratio and the helix angle in the drill tip portion 1 may be substantially equal to those of the drill of FIG. 1. The flute width ratio and helix angle at the terminal end of the helical flute may be substantially equal to those in the drill rear portion of the drill shown in FIG. 1.

In either of the embodiments of FIGS. 1 and 5, an insert 8 made from cemented carbide and having cutting edges 9 and margins 10 is brazed to the tip of the drill. But this invention is also applicable to a drill made from a single material or a drill in which margins extend to near the terminal end of the helical flute.

We will now briefly describe how the helical flute according to this invention is formed.

If a cemented carbide insert is to be attached to the tip of the drill, the flute has to be worked before the insert is brazed. For this purpose, a ball end mill of the size matching the size of an intended flute is moved longitudinally of the drill from its tip. To change the flute width, the ball end mill is shifted to one side of the flute while moving it longitudinally. In this case, the flute is formed by moving the end mill only once. But from the portion of the flute where its width is changing to the flute end, the flute is left unmachined along its other side. Thus, the ball end mill is moved along the flute again to machine the other side. At the portion of the drill where the ball end mill has moved twice, a rib is formed on its bottom. Such a rib is removed by buffing or cutting. The helical groove is thus finished.

EXAMPLES

Figure 6:
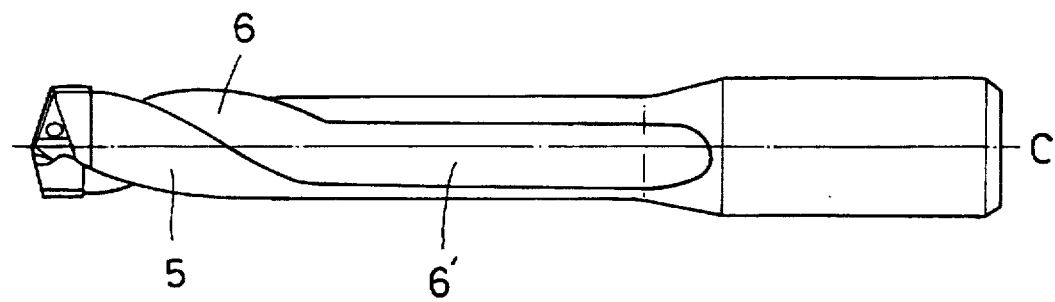
FIG. 6 is a side view of a conventional drill.
Figure 7:
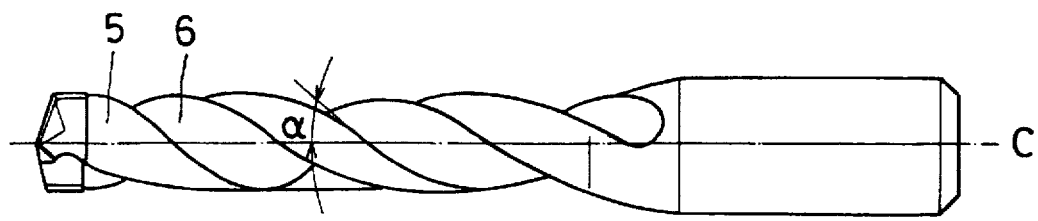
FIG. 7 is a side view of another conventional drill.

For a performance test, drills having a diameter D=15 mm and a flute length of 110 mm with a cemented carbide insert brazed thereto and having an oil hole were prepared. They include a drill of the type shown in FIG. 6 (Specimen No. 13), a drill of the type shown in FIG. 7 (No. 11), a drill basically of the same type as the drill of FIG. 1 with the angle $\alpha 1$ equal to $\alpha 3$ (No. 12), and drills of the type shown in FIG. 1 (Nos.1–10). Specimen Nos. 11 to 13 are conventional drills, while Specimen Nos. 1–10 are drills according to the present invention. The insert attached to each of these drills is made from K30 under ISO standard or its equivalent.

Table 1 shows specifications of these drills and test results.

In the performance test, the test drills were used to drill holes in a workpiece made from alloy steel SCM440 (Brinell hardness HB=300) under the following conditions, and increases in machining power due to clogging with chip was measured.

Machining conditions:

Machining speed V=50 m/min

Feed f=0.25 mm/rev

Depth of hole d=107 mm (7D)

Other conditions: wet machining using machining oil

Chip produced while drilling a hole tends to sharply increase the machining power. Thus, by measuring the machining power, it is possible to determine how efficiently chip is discharged. From the table, it is apparent that the drills according to the present invention can discharge chip more efficiently than the conventional drills. Specimens 1–3, having helix angles and flute width ratios within the preferred range, were especially high in the ability to discharge chip, as evidenced by the fact that the maximum machining power was equal to or under 4.1 kw. Specimens No. 1 to 3 were also high in their ability to drill straight holes. That is, none of the holes drilled by these drills were bent by more than 0.15 mm.

Specimen No. 4 was low in the maximum machining power but the hole drilled by this drill was bent by 0.56 mm. This is presumably because the flute was too wide.

Figure 8:
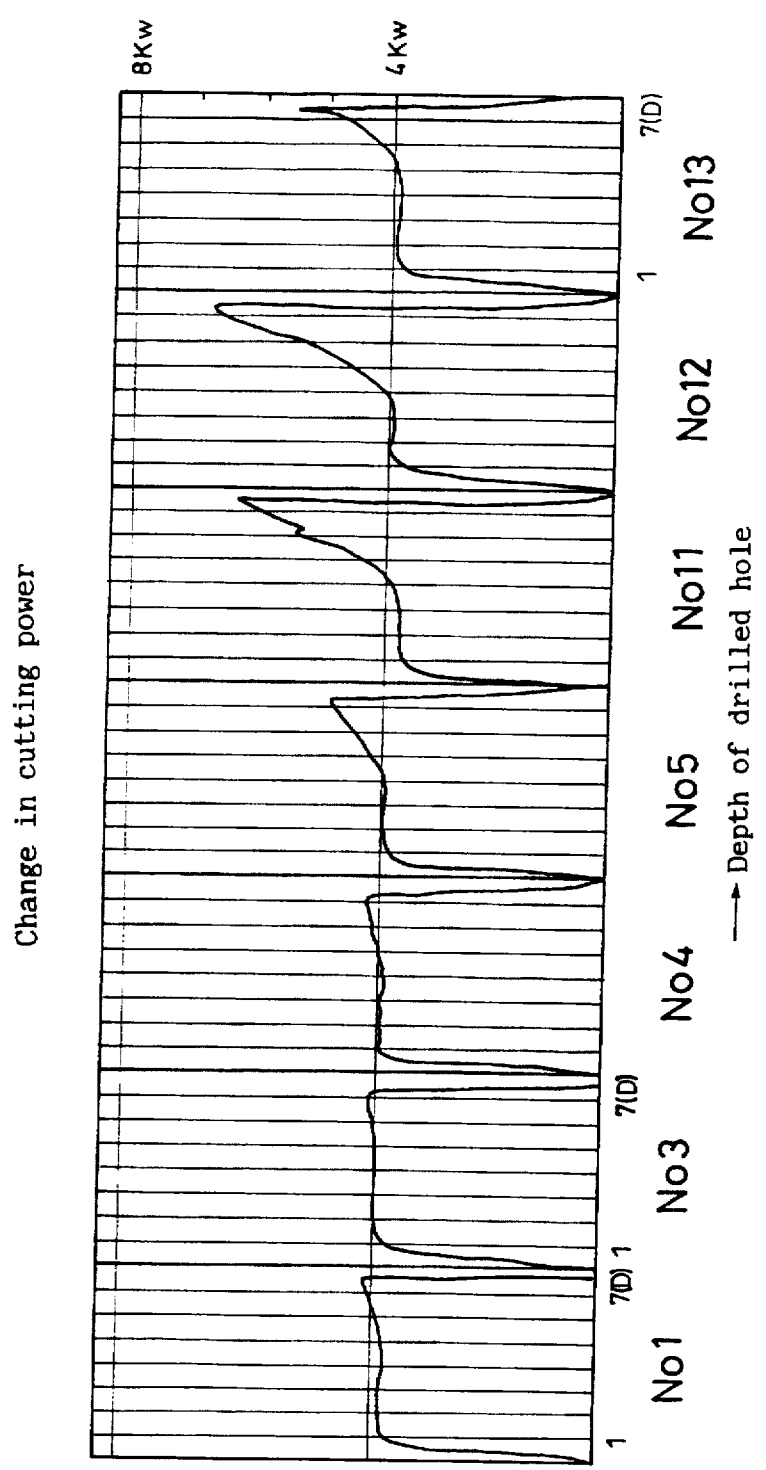
FIG. 8 is a graph showing machining power needed for each drill specimen.

FIG. 8 shows fluctuations in the machining power for Specimens Nos. 1, 3–5 and 11–13. For the No. 4 drill, the cutting power fluctuated at a small amplitude, which shows that this drill is low in rigidity. For Specimens Nos. 11 and 12, the machining power increased sharply when the hole depth increased to about 4D. For the drills according to the present invention, the cutting power did not increase sharply until the hole depth increased to about 5D.

Compared with No. 3, Nos. 5, 6 and 9 are not so marked in their ability to lower the machining power. But in the case of the drills according to this invention, it is possible to improve the ability to discharge chip by changing helix angles and flute width ratios at various portions. For Specimen No. 13, such improvement in performance is practically impossible. (For example, if the helix angle at the tip portion were increased, chip would have to be moved an unduly long distance until discharged, and if it were reduced, the chip flowing force due to screw effects will drop.) For the above reason, the drills of the invention are advantageous over Specimen No. 13.

As described above, the drill according to this invention has a helical flute which is wider in the drill rear portion than in the drill tip portion. Its helix angle is smaller in the rear portion than in the tip portion. This drill can form a deep hole while discharging chip smoothly without the possibility of getting clogged with chip.

Since the width and helix angle of the flute are constant in the drill tip portion, the drill will show unchanged performance after its cutting edges have been regenerated. That is, even after regeneration, the shape of chip will not change at all. This assures a stable drilling.

TABLE 1

|  |  | tip portion | | middle | rear portion | | |
| --- | --- | --- | --- | --- | --- | --- | --- |
|  | No | helix angle | flute width ratio | portion length | helix angle | flute width ratio | increase in cutting power (%) |
| Drill of this invention | 1 | 20° | 0.8:1 | 1.5D | 6° | 1.1:1 | 106 |
|  | 2 | 20° | 0.8:1 | 1.5D | 8° | 1.1:1 | 103 |
|  | 3 | 20° | 1:1 | 1.5D | 6° | 1.3:1 | 103 |
|  | 4 | 20° | 1.2:1* | 1.5D | 6° | 1.5:1 | 106 |
|  | 5 | 20° | 0.8:1 | 2D | 15°* | 1.1:1 | 128 |
|  | 6 | 20° | 0.8:1 | 3D | 2°* | 1.1:1 | 125 |
|  | 7 | 15° | 0.8:1 | 1.5D | 8° | 1.1:1 | 105 |
|  | 8 | 30° | 0.8:1 | 1.5D | 3° | 1.1:1 | 107 |
|  | 9 | 13°* | 0.8:1 | 2D | 6° | 1.1:1 | 108 |
|  | 10 | 35°* | 0.8:1 | 1.5D | 6° | 1.1:1 | broken |
| Conventional drill | 11 | 25° | 0.8:1 | 0* | 25°* | 0.8:1 | 178 |
|  | 12 | 20° | 0.4:1* | 1.5D | 20°* | 0.8:1 | 180 |
|  | 13 | 20° | 0.8:1 | 1.5D | 0°* | 1.1:1 | 135 |

*outisde the preferable range (Increase in cutting power indicates the percentage of increase in maximum cutting power with respect to cutting power in stable machining.)

What is claimed is:

1. A drill comprising a tip portion formed with a helical flute having a constant width and helix angle, a rear portion formed with a helical flute which has a constant width and helix angle but is greater in width and smaller in helix angle than the helical flute formed in said tip portion, and a middle portion provided between said tip portion and said rear portion and formed with a helical flute smoothly connecting with the helical flutes of said tip portion and said rear portion and having a gradually increasing width and a gradually decreasing helix angle from said tip portion toward said rear portion.

2. A drill as claimed in claim 1 wherein a groove width ratio a1:c1 in said tip portion is 0.5–1:1, wherein a groove width ratio a3:c3 in said rear portion is 0.8–1.3:1, wherein the helix angle of the helical flute formed in said tip portion is 15°–30°, and wherein the helix angle of the helical flute formed in said rear portion is 3°–8°.

3. A drill as claimed in claim 2, wherein the length of said tip portion is 1D to 2D wherein D is the diameter of the drill and the length of said middle portion is 1D to 3D.

4. A drill having a helical flute formed therein, said helical flute having a constant width and helix angle at the tip portion of the drill, and said helical flute at the remaining portion of the drill having a gradually increasing width and a gradually decreasing helix angle toward the terminal end of said helical flute.

* * * * *